US012667985B1

(12) United States Patent
Piaskowy et al.

(10) Patent No.: US 12,667,985 B1
(45) Date of Patent: Jun. 30, 2026

(54) MECHANICAL BREAKERS WITH AUTOMATIC RESETTING FEATURE

(71) Applicant: Amazon Technologies, Inc., Seattle, WA (US)

(72) Inventors: Walter Anthony Piaskowy, Sammamish, WA (US); Mary Elizabeth Conrad, Seattle, WA (US); Colin Coker, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 99 days.

(21) Appl. No.: 18/899,477

(22) Filed: Sep. 27, 2024

(51) Int. Cl.
    *B25J 19/00*     (2006.01)
    *B25J 13/08*     (2006.01)

(52) U.S. Cl.
    CPC ......... *B25J 19/0004* (2013.01); *B25J 13/085* (2013.01)

(58) Field of Classification Search
    CPC ............................ B25J 19/0004; B25J 13/085
    See application file for complete search history.

(56) References Cited

U.S. PATENT DOCUMENTS

| | | | | |
|---|---|---|---|---|
| 9,457,401 | B2 * | 10/2016 | Tacheny | B22D 31/00 |
| 9,759,369 | B2 * | 9/2017 | Gray | F16B 2/10 |
| 10,920,434 | B1 * | 2/2021 | Pearson, Jr. | E04G 21/22 |
| 11,282,664 | B2 * | 3/2022 | Clark | H01H 71/56 |
| 11,674,321 | B2 * | 6/2023 | Pearson, Jr. | E02F 5/006 |
| | | | | 701/50 |
| 2017/0005458 | A1 * | 1/2017 | Burke | H02B 1/052 |
| 2023/0417617 | A1 * | 12/2023 | Chalofsky | G01M 1/045 |

OTHER PUBLICATIONS

Bourne et al., Mobile manufacturing of large structures, 2015, IEEE, p. 1565-1572 (Year: 2015).*
Kazerooni et al., A robotic end-effector for grasping postal sacks, 2003, IEEE, p. 260-265 (Year: 2003).*
Backes et al., BiBlade sampling tool validation for comet surface environments, 2017, IEEE, p. 1-20 (Year: 2017).*
Moon et al., Development of New End-Effector for Proof-of-Concept of Fully Robotic Multichannel Biopsy, 2015, IEEE, p. 2996-3008 (Year: 2015).*
Aris et al., Development of an automatic lighter packaging system for small and medium scale industries, 2003, IEEE, p. 1021-1026 (Year: 2003).*

* cited by examiner

*Primary Examiner* — McDieunel Marc
(74) *Attorney, Agent, or Firm* — Eversheds Sutherland (US) LLP

(57)     ABSTRACT

Systems and methods for mechanical breakers with automatic resetting features and related systems. In one embodiment, an example breaker assembly includes a base portion having a backplate having a fixed position, a spring coupled to the backplate, and a first bracket configured to receive a securing member, where the securing member secures the spring to the first bracket. The breaker assembly may include a pivot portion configured to pivot with respect to the base portion, the pivot portion having a second bracket having a detent surface configured to engage the securing member when the breaker assembly is in a default position, and a member coupled to the pivot portion. The pivot portion pivots with respect to the base portion based at least in part on a force applied to the member, and the pivot portion returns to the default position automatically when the force is no longer applied.

20 Claims, 10 Drawing Sheets

MECHANICAL BREAKERS WITH AUTOMATIC RESETTING FEATURE

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that manual efforts can be redirected to different tasks.

Figure 1A:
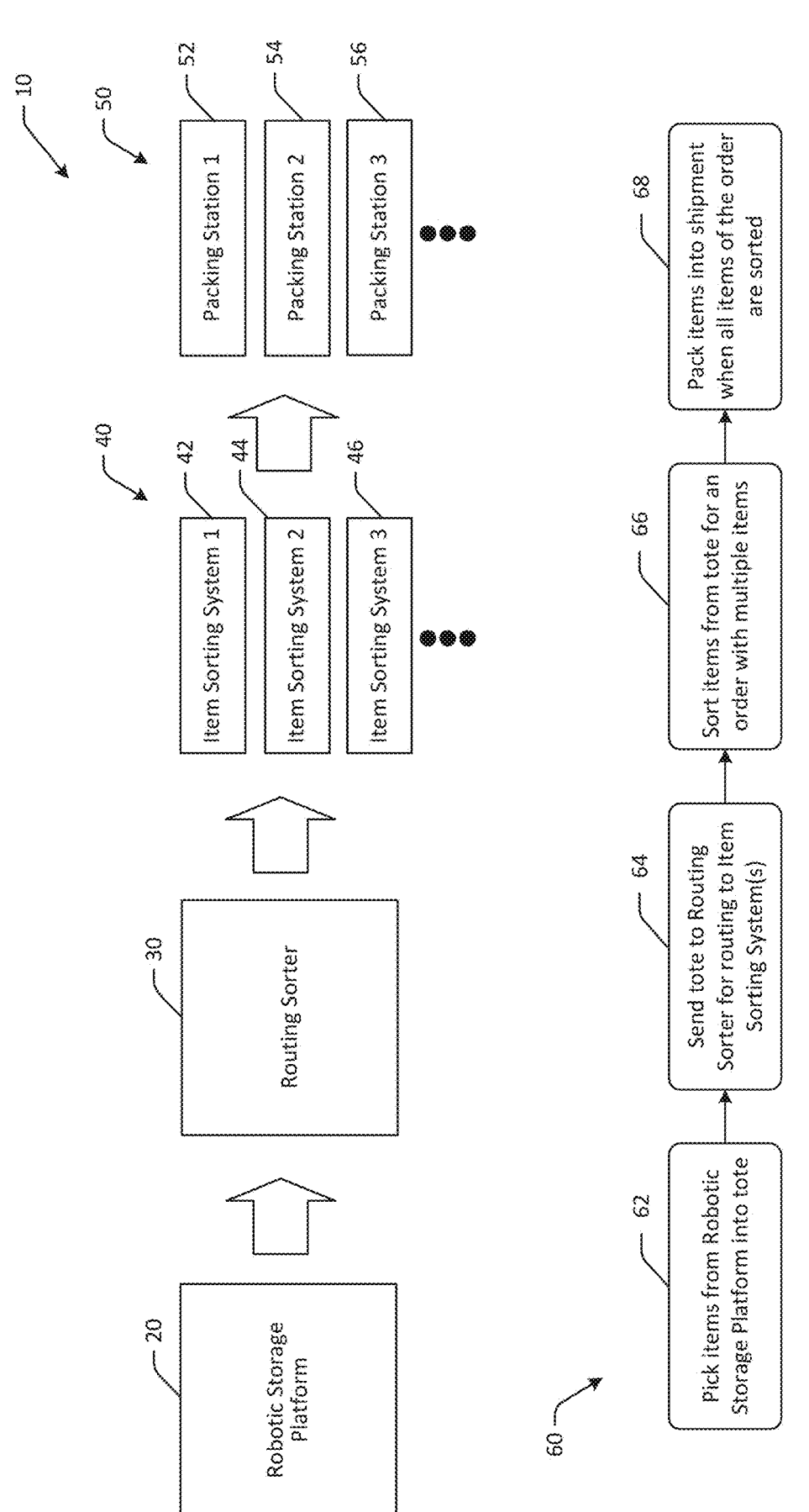
FIGS. 1A-1C are hybrid schematic illustrations of an example use case for mechanical breakers with an automatic resetting feature and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. In addition, retrieving a certain number of items, such as singular items, or multiple items in cluttered environments (e.g., stacked on top of each other or otherwise in a number of layers, etc.), may be difficult, and may depend on a type of packaging in which the item comes with. Humans may be able to manually handle individual items with case. However, robotic handling of items may require various levels of dexterity. Similarly, when retrieving items from cluttered areas, such as a single item from a bin full of items, robotic manipulators may be limited by an exposed area of the item to be grasped, and so forth. Moreover, when storing items, mechanical systems may be used to handle securing flaps that secure access to storage areas, such as elastic bands that secure items in storage pods. In one example, a hook coupled to a robotic gantry may be used to move elastic bands in order to provide access to store items in a storage pod. However, if the hook, member, or another component coupled to a gantry interacts with an obstacle or incorrect elastic flap, the storage pod may be damaged and/or operation may be paused, resulting in downtime.

Embodiments of the disclosure include methods and systems for mechanical breakers with automatic resetting features. Certain systems provide breaker assemblies with modifiable breaking forces that automatically break when interacting with a predetermined force value, so as to avoid damaging storage pods and/or other equipment in a facility. Moreover, the breaker assemblies described herein also automatically reset to an operable or default position without manual intervention, so as to further reduce downtime. For example, once an applied force to the breaker assembly is removed, the breaker assembly may reset to a default position and operation may continue. In one embodiment, breaker assemblies may be serially installed transmission systems that supports a rigid connection between motor and output up to a set torque, after which the breaker assembly allows relative motor-to-output rotation (e.g., up to 70 degrees or more, etc.) in order to reduce torque on the remainder of the system. When the torque once again drops in magnitude below the set torque, the breaker automatically returns to the original position and rigid structure. Embodiments may therefore allow for large deflection and an automatic return to the starting position. Such systems may have improved control over mechanical components and reduce a likelihood of item damage, as well as provide increased robustness, repeatability, durability, and overall facility throughput. Some embodiments include optimized process flows for processing of orders at fulfillment centers, as well as process flows or methods to increase speed of transporting items as a result of improved item handling. As a result, throughput of fulfillment centers may be improved, and/or logistics of fulfillment center operations may be less complicated.

Referring to FIGS. 1A-IC, an example use case 10 for mechanical breakers with an automatic resetting feature and an example process flow in accordance with one or more embodiments of the disclosure. Although discussed in the context of online orders, other embodiments may be directed to any suitable use case where products or containers are picked and/or sorted, or packages are sorted, such as instances where users may pick up orders rather than receiving a shipment, instances where items are aggregated for transport to another fulfillment center, and so forth.

In FIG. 1A, a fulfillment center may include a robotic storage platform 20, a routing sorter 30, one or more item sorting systems 40, and one or more packing stations 50. The robotic storage platform 20 may be a portion of the fulfillment center at which products picked from product inventory are placed. Inventory may be stored in containers in flexible container pods in some instances. Robots may be used with end of arm tools may be used to pick products from inventory and/or to deliver to the robotic storage platform in some instances, while in other instances, manual effort or a combination thereof may be used to pick products. The picking process at the robotic storage platform may include locating a product in an order, obtaining the product, and sending the product to the robotic storage platform 20, such as via a conveyor belt. In the illustrated embodiment, products at the robotic storage platform 20 may be placed in a container, such as a tote. The tote may optionally be assigned to, or otherwise associated with, a particular item sorting system machine in some instances. For example, a certain tote may be associated with a certain item sorting system, such that products that are designated to be picked and placed in the tote are for orders that are to be consolidated at that particular item sorting system. The association between the tote and the item sorting system may be static in some instances. In other embodiments, there may not be any association between totes and item sorting systems, or associations may be dynamic.

At the routing sorter 30, totes including products that have been picked may be routed to the appropriate or designated item sorting system. For example, the routing sorter 30 may optionally determine an identifier associated with the tote, and may determine one or more item sorting systems to which the tote is to be routed using the identifier or using another factor, such as sortation system load. The routing sorter 30 may route or direct the tote to an item sorting system.

The item sorting systems 40 may include one or more item sorting system machines. In FIG. 1A, a first item sorting system 42, a second item sorting system 44, a third item sorting system 46, and so forth may be included. Any number of item sorting systems may be included. Some or all of the item sorting systems may optionally be associated with certain totes. The item sorting systems may be used to consolidate or otherwise aggregate products for single or multi-item orders and/or for transfer to a different fulfillment center. For example, a first tote may include a first item of a multi-item order, and a second tote may include a second item of the multi-item order. The item sorting system may therefore identify the orders associated with the respective products in a tote, and may transport the products to a container, such as a tote, a flexible container, a specific chute leading to a container, or a different container associated with the order. When the order is complete with all of the products in the associated chute or container, the order may be packed. In instances where a container is designated for a different fulfillment center, as opposed to an online order, the container may be packed when full, as opposed to when certain items are placed into the container (e.g., there may not be any specific items that need to be in the container before packing, rather, the container may just be a certain threshold full, etc.). Accordingly, a specific item sorting system may be designated for fulfillment of a particular multi-item order. As a result, all of the products in the multi-item order may be placed in totes that are directed to that particular item sorting system. At the item sorting systems 40, totes that are received via the routing sorter 30 may be emptied, and the products in the respective totes may be transported to the appropriate chutes or containers for the orders for which the products were picked.

After a single or multi-item order is complete (e.g., the item sorting system has delivered all of the products in the order to the appropriate chute, container, etc.), or when a container designated for another fulfillment center is full (where full is a configurable threshold, such as about 60% full capacity, 70% full capacity, 80% full capacity, 90% full capacity, etc.), the order may be packed at the packing station 50. In some embodiments, one or more packing stations may be included. In some instances, a packing station may service more than one item sorting system, while in other instances, more than one packing station may service one item sorting system. In the illustration of FIG. 1A, a first packing station 52 may be used to pack orders from the first item sorting system 42, a second packing station 54 may be used to pack orders from the second item sorting system 44, a third packing station 56 may be used to pack orders from the third item sorting system 46, and so forth. At the packing stations 50, the orders may be placed into boxes and sealed for subsequent shipment. The packages may then be processed for shipment to the user. In another example, the containers may be stacked, closed, or otherwise packed for shipment to another fulfillment center.

At the fulfillment center, an example process flow 60 illustrated in FIG. 1A may be implemented to improve the efficiency and/or throughput of the fulfillment center. At a first block 62, items may be picked from the robotic storage platform 20 into a tote that may optionally be associated with a specific item sorting system. At a second block 64, the tote may be sent to the routing sorter 30 for routing to an item sorting system. At a third block 66, the items from the tote may be sorted for an order with multiple item by the specific item sorting system. At a fourth block 68, the items may be packed into a shipment when all of the items in the order are sorted.

Figure 1B:
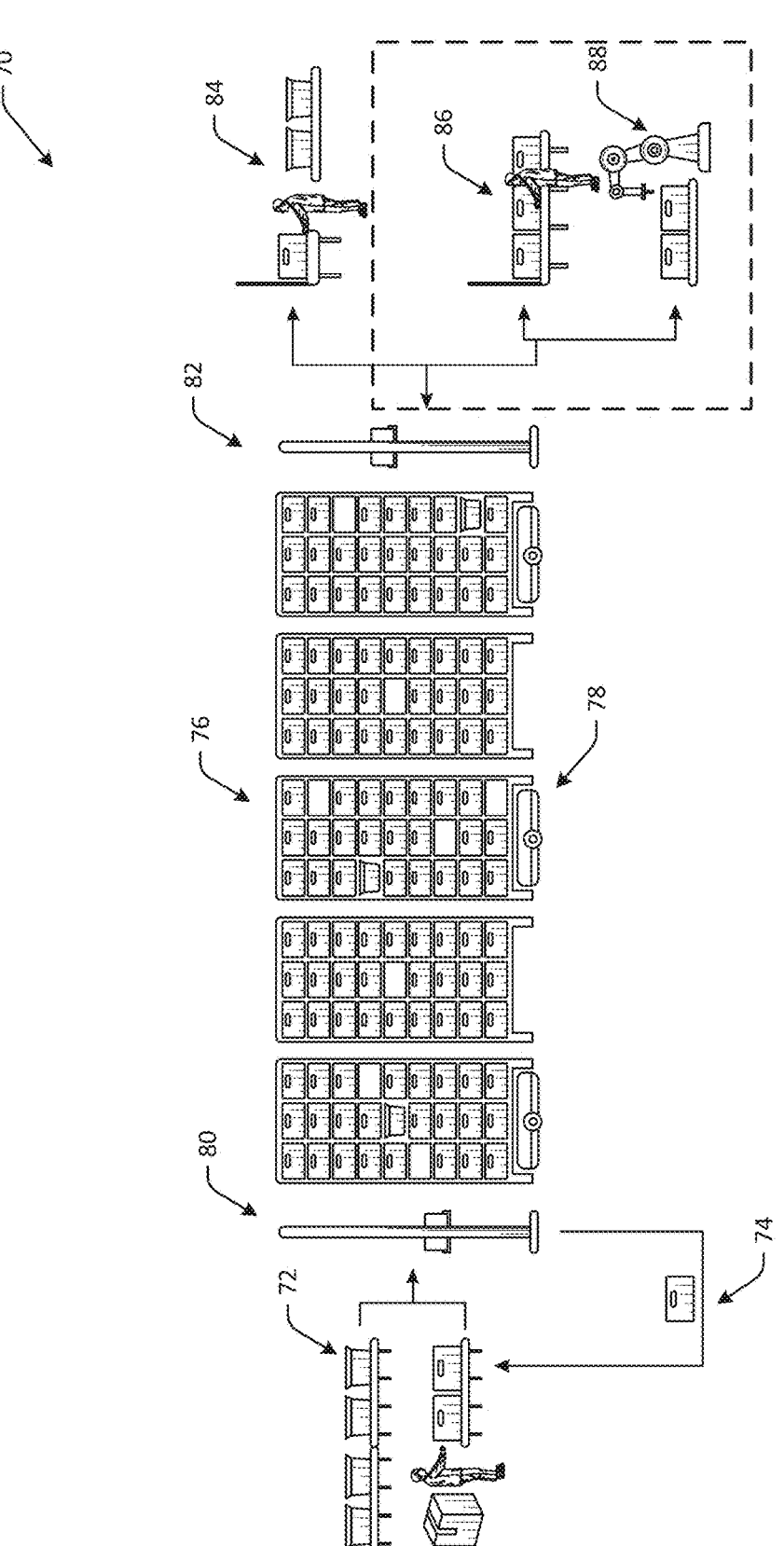

In FIG. 1B, an example automated storage and retrieval environment 70 is depicted. The automated storage and retrieval environment 70 may be a containerized fulfillment center solution that stores inventory in totes and implements automated workflows. The automated storage and retrieval environment 70 may include a consolidation workflow, which involves combining inventory from emptier containers into fuller containers in order to ensure an automated induct process is not blocked due to insufficient empty/free spaces on container storage racks 76 for inserting new containers. Containerized inventory can flow through the automated storage and retrieval environment 70 via induct at containers 72 (which can include a decant process to move items to empty high capacity containers 74. A first gantry 80 may be used to load and/or unload containers from the container storage racks 76. The container storage racks 76 may be transported using autonomous robots 78. A second gantry 82 may be used to load and/or unload containers from the container storage racks 76. Containers may be moved downstream for manual or automated picking at a pick station 84, to a consolidation station 86 to consolidate items into fewer containers, and/or to robotic work cells 88 for automated picking and/or placement of items into or from containers.

Embodiments of the disclosure include mechanical breakers with automatic resetting feature that can be used with various mechanical equipment throughout a facility, such as equipment configured to handle items to be stored in and/or retrieved from bins or containers, storage areas, conveyors, place items into bins or pods, and so forth. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

ILLUSTRATIVE EMBODIMENTS AND USE CASES

Figure 1C:
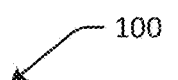
Figure 1C:
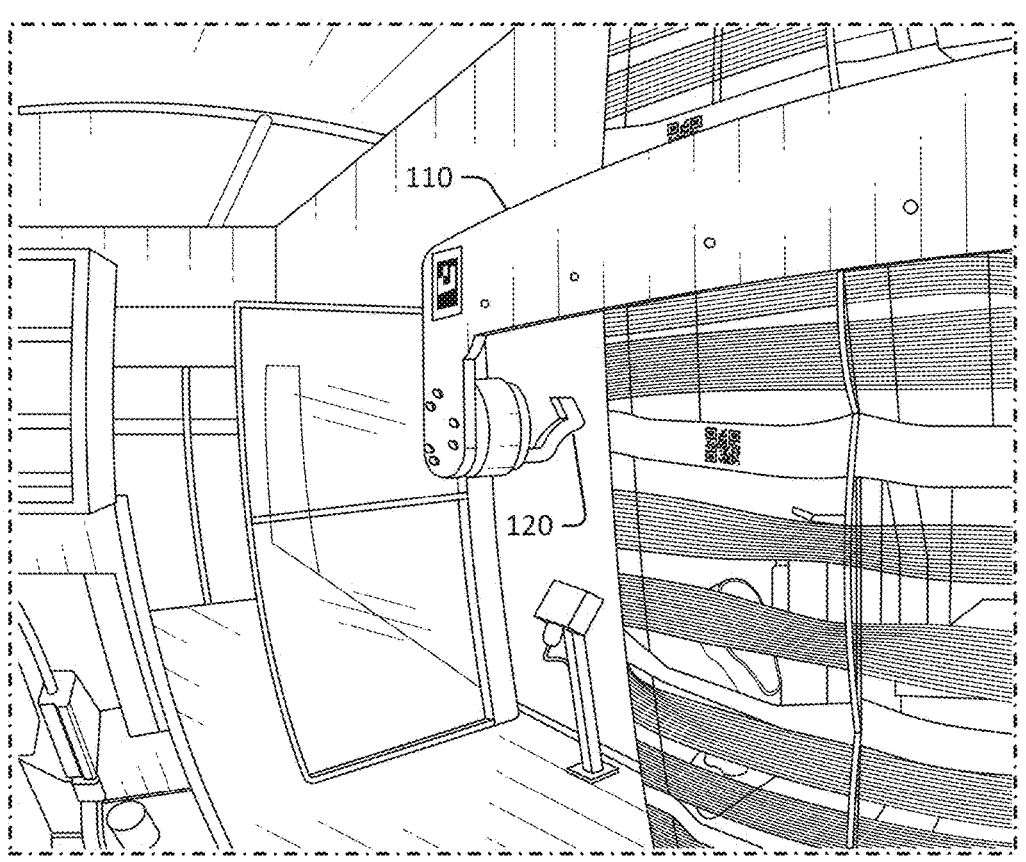
Figure 2:
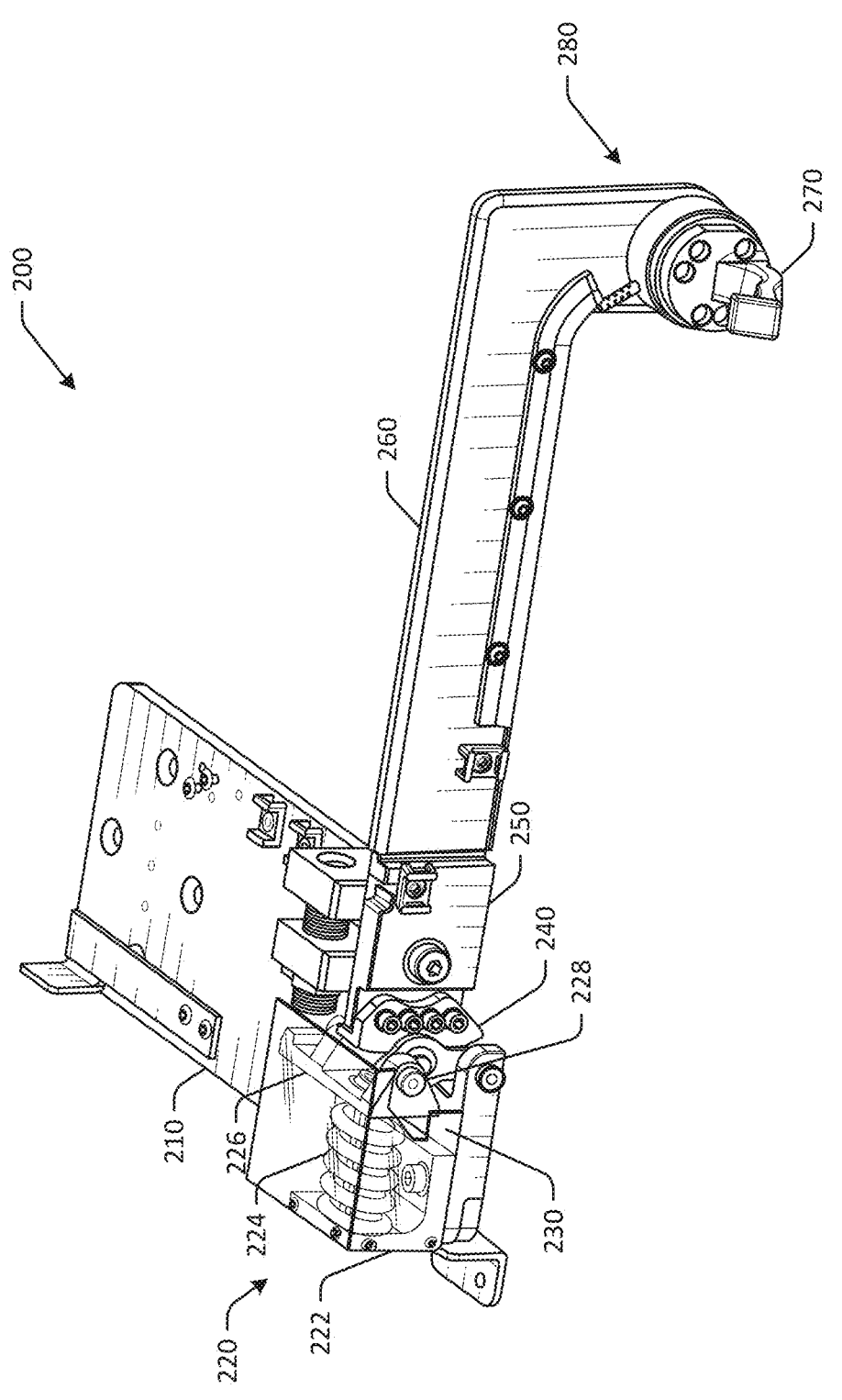
FIG. 2 is a schematic illustration of an example mechanical breaker assembly in accordance with one or more embodiments of the disclosure.

FIG. 2 is a schematic illustration of an example mechanical breaker assembly in accordance with one or more embodiments of the disclosure. Other embodiments may include additional or fewer components. The illustration of FIG. 2 may not be to scale, and may not be illustrated to scale with respect to other figures. The mechanical breaker assembly illustrated in FIG. 2 may be used throughout the fulfillment center environment discussed with respect to FIGS. 1A-1C.

Inventory systems are utilized for storing and managing inventory. For example, some retailers may utilize a warehouse of racks that store items in various containers (also referred to as bins, storage locations, etc.). Items may be stowed in the various containers to hold the item in preparation for picking. For example, when an order for a specific item needs to be fulfilled by a retailer, the item can be picked (or retrieved) from the container where the item is stored. Inventory systems may use a mechanical system to stow an item into a container and/or pick an item from the container. The mechanical system may include a robotic arm that permits various sensors and end of arm tools (also referred to herein as end effectors and/or item manipulation devices) to interact with items outside and/or within multiple containers. Further, as used herein, an "item" may refer to an individual item, multiple items, a package containing an individual item, a package containing multiple items, etc.

In FIG. 2, an example mechanical breaker assembly 200 is depicted in perspective view. The mechanical breaker assembly 200 may be coupled to a robotic manipulator, such as a robotic gantry. The mechanical breaker assembly 200 may be configured for use with a hook or other component to lift and/or remove elastic bands or to otherwise provide access to storage pods in some embodiments. The mechanical breaker assembly 200 may be coupled to a gantry or other robotic manipulator via connection plate 210. In one example, the mechanical breaker assembly 200 may be coupled to a robotic gantry configured to move in a vertical direction.

The mechanical breaker assembly 200 may include a base portion 220 and a pivot portion 250. A member 260 may be coupled to the pivot portion 240 directly or via one or more intermediate portions. A tool, such as a hook 270, may be disposed at an end 280 of the member 260. In some embodiments, the hook 270 is coupled to the member 260.

The pivot portion 250 may be configured to pivot with respect to the base portion 220. For example, the pivot portion 250 may rotate with respect to the base portion 220 when a certain amount of force is applied to the member 260 and/or hook 270. In some embodiments, the pivot portion 250 rotates or pivots with respect to the base portion 220 based at least in part on a force applied to the member 260, and the pivot portion 250 returns to a default position (e.g., as depicted in FIG. 2) automatically when the force is no longer applied to the member 260. The pivot portion 250 may be configured to pivot in both an upwards direction and a downwards direction relative to the base portion 220. Accordingly, the mechanical breaker assembly 200 may provide breaker protection in a vertical direction. Other embodiments may be deployed in lateral directions.

The base portion 220 may include a backplate 222 that may be coupled to a support surface 230, a first bracket 226, a spring 224, and a securing member 228. The backplate 222 may have a fixed position relative to the support surface 230. In some embodiments, the support surface 230 may have a groove or other recessed geometry that receives a portion of the backplate 222, such as a protrusion or raised or extended portion having a corresponding geometry, so as to secure a position of the backplate 222. In one example, the backplate 222 has an extended portion along a lower surface of the backplate 222, and the support surface 230 has a groove configured to receive the extended portion of the backplate 222.

The spring 224 may be coupled to the backplate 222. The spring 224 may have a fixed spring constant. The spring 224 may be disposed between the backplate 222 and the first bracket 226. The spring 224 may be coupled to the first bracket 226 and may be preloaded or have a spring preload value based at least in part on compression of the spring between the backplate 222 and the first bracket 226. The spring preload value of the spring 224 may be modifiable via modifying a distance between the first bracket 226 and the backplate 222. The spring force may be customized to determine when the breaker assembly 200 breaks.

The first bracket 226 may be configured to receive the securing member 228. In some embodiments, the securing member 228 secures the spring 224 to the first bracket 226. In other embodiments, the securing member 228 may be used to impart force on the spring 224. The securing member 228 may be a bolt, rolling member, cylindrical member, screw, or other type of member and may extend laterally across the first bracket 226. In one example, the securing member 228 is a rolling member disposed laterally across the first bracket 226, and a body of the rolling member is configured to engage a detent surface of the pivot portion when the breaker assembly is in a default position.

The pivot portion 250 may include a second bracket 240 having a detent surface configured to engage the securing member 228 when the breaker assembly is in a default position. The pivot portion 250 may include the member 260 coupled to the pivot portion 250 and/or one or more additional components. The detent surface, as discussed herein, moves with respect to the securing member 228 to provide breaking functionality. The mechanical breaker assembly 200 may therefore automatically reset to the default or operable position when force is removed due to interaction between the pivot portion 240 detent curvature and securing member interaction.

Figure 3:
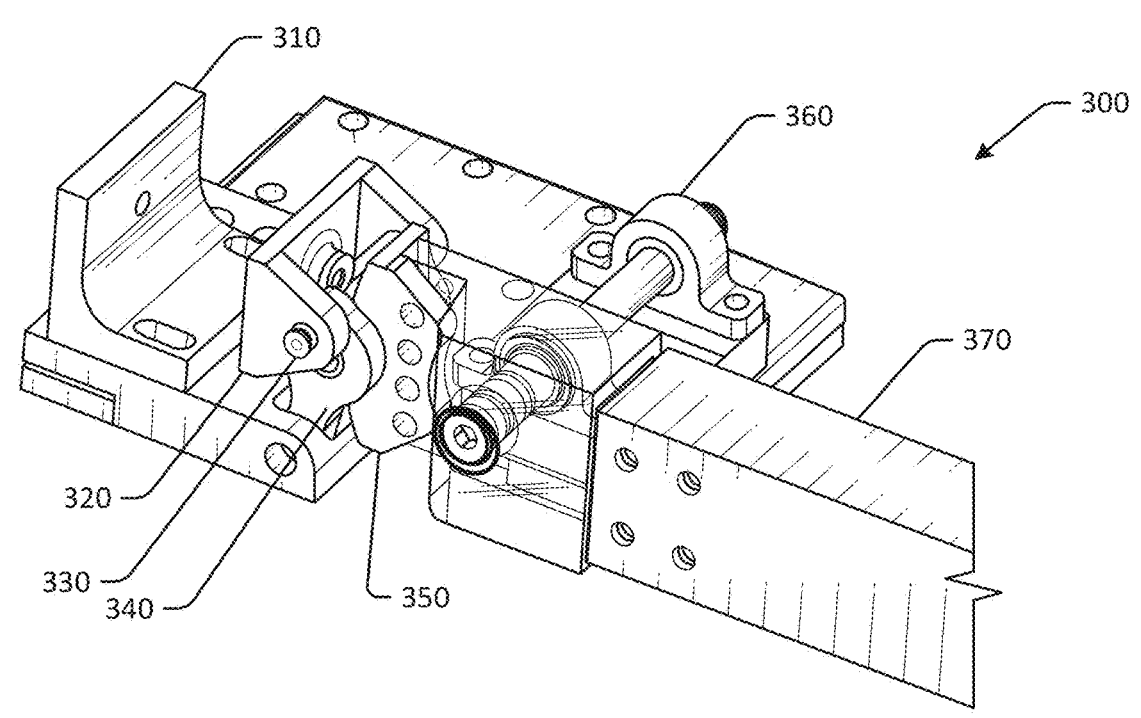
FIG. 3 is a schematic illustration of an example mechanical breaker assembly in various views in accordance with one or more embodiments of the disclosure.
Figure 3:
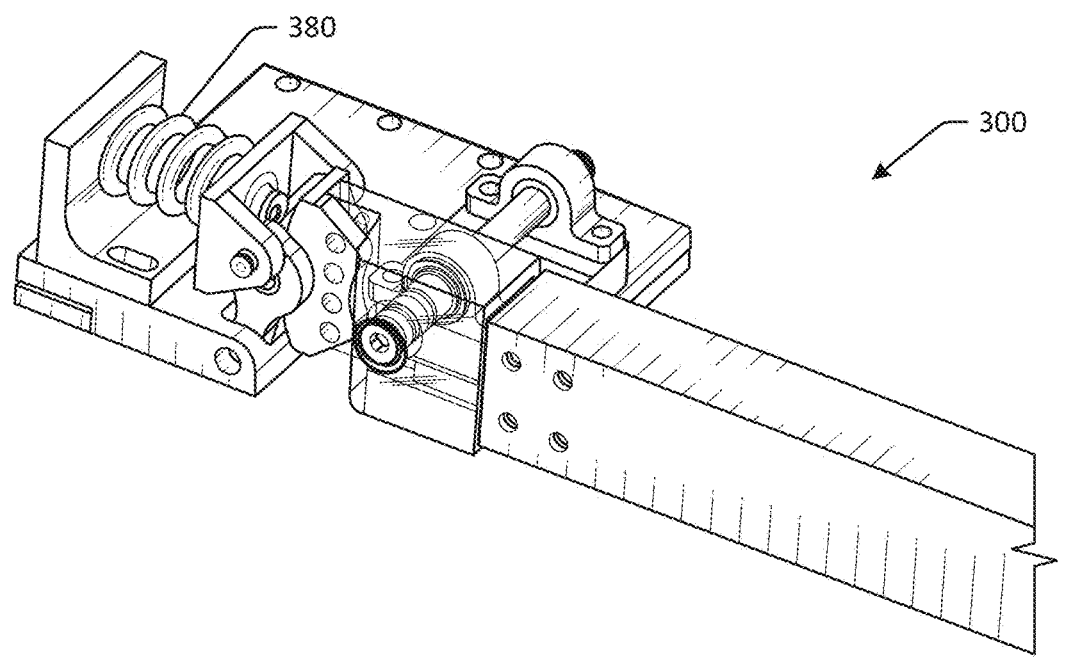

FIG. 3 is a schematic illustration of an example mechanical breaker assembly in various views in accordance with one or more embodiments of the disclosure. Other embodiments may include additional or fewer components. The illustrations of FIG. 3 are not to scale, and may not be illustrated to scale with respect to other figures. The mechanical breaker assembly illustrated in FIG. 3 may be the same mechanical breaker assembly discussed with respect to FIGS. 1A-2.

In FIG. 3, a mechanical breaker assembly 300 is depicted in close-up view. The mechanical breaker assembly 300 may include the backplate 310 having a fixed position relative to a support surface 312, and a first bracket 320. The mechanical breaker assembly 300 may include a pivot member 340 that is coupled to the support surface 312, where the pivot member 312 can be optionally configured to pivot with respect to the support surface 312. In other embodiments, the pivot member 312 may be a static member coupled to the support surface 312. The first bracket 320 may be coupled to the pivot member 340 and configured to move relative to the pivot member 340. Securing member 330 may be configured to slide or move along one or more apertures formed in the pivot member 340, so as to provide additional range of motion. The pivot member 340 may be coupled to a second bracket 350 of the pivot portion. One or more rotation assemblies 360 may be used to allow a member 370 to rotate with respect to the first bracket 320. The mechanical breaker assembly 300 is depicted with and without a spring 380 in FIG. 3.

Accordingly, the mechanical breaker assembly 300 may include a base portion having a backplate having a fixed position, a spring coupled to the backplate, and a first bracket configured to receive a securing member, where the securing member secures the spring to the first bracket. The breaker assembly may include a pivot portion configured to pivot with respect to the base portion, the pivot portion having a second bracket having a detent surface configured to engage the securing member when the breaker assembly is in a default position, and a member coupled to the pivot portion. The pivot portion pivots with respect to the base portion based at least in part on a force applied to the member, and the pivot portion returns to the default position automatically when the force is no longer applied.

Figure 4:
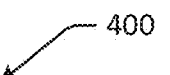
FIG. 4 is a schematic illustration of a portion of a mechanical breaker assembly in accordance with one or more embodiments of the disclosure.
Figure 4:
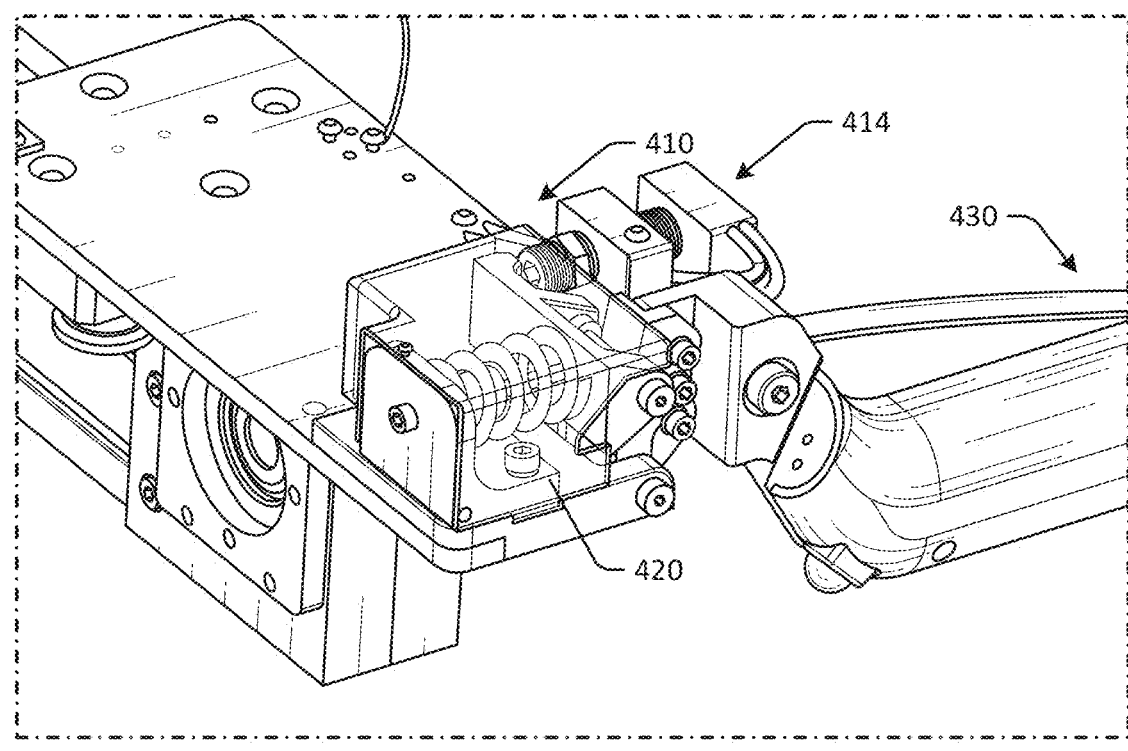

FIG. 4 is a schematic illustration of a portion of a mechanical breaker assembly in accordance with one or more embodiments of the disclosure. Other embodiments may include additional or fewer components. The illustration of FIG. 4 is not to scale, and may not be illustrated to scale with respect to other figures. The mechanical breaker assembly illustrated in FIG. 4 may be the same mechanical breaker assembly discussed with respect to FIGS. 1A-3.

In FIG. 4, a breaker assembly 400 is depicted in rear perspective view. The breaker assembly 400 may include a base portion 410 and a pivot portion 430, where the pivot portion 430 may be configured to pivot or rotation with respect to the base portion 410. The base portion 410 may include one or more fixed position portions, such as a backplate 420 coupled to a support surface 422.

The breaker assembly 400 may be used with a system that includes a robotic gantry and the breaker assembly 400. The breaker assembly 400 may include a base portion with a backplate having a fixed position, a spring coupled to the backplate, and a first bracket configured to receive a securing member. The breaker assembly 400 may include a pivot portion configured to pivot with respect to the base portion, the pivot portion having a second bracket having a detent surface configured to engage the securing member when the breaker assembly is in a default position, a member coupled to the pivot portion, and a hook coupled to the member. The pivot portion pivots with respect to the base portion based at least in part on a force applied to the member, and the pivot portion returns to the default position automatically when the force is no longer applied to the member.

Figure 5A:
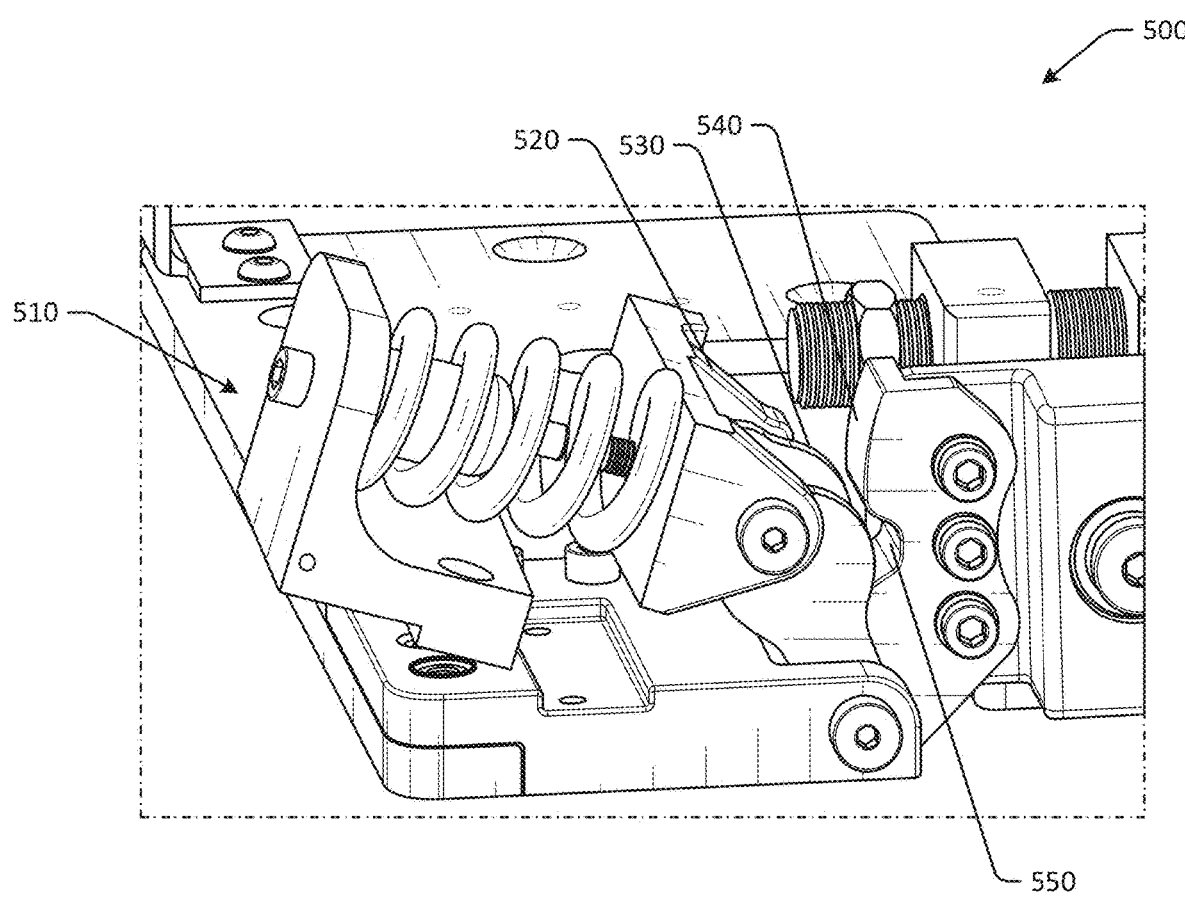
FIGS. 5A-5C are schematic illustrations of an example mechanical breaker assembly in secured and unsecured views in accordance with one or more embodiments of the disclosure.
Figure 5B:
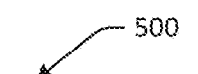
Figure 5B:
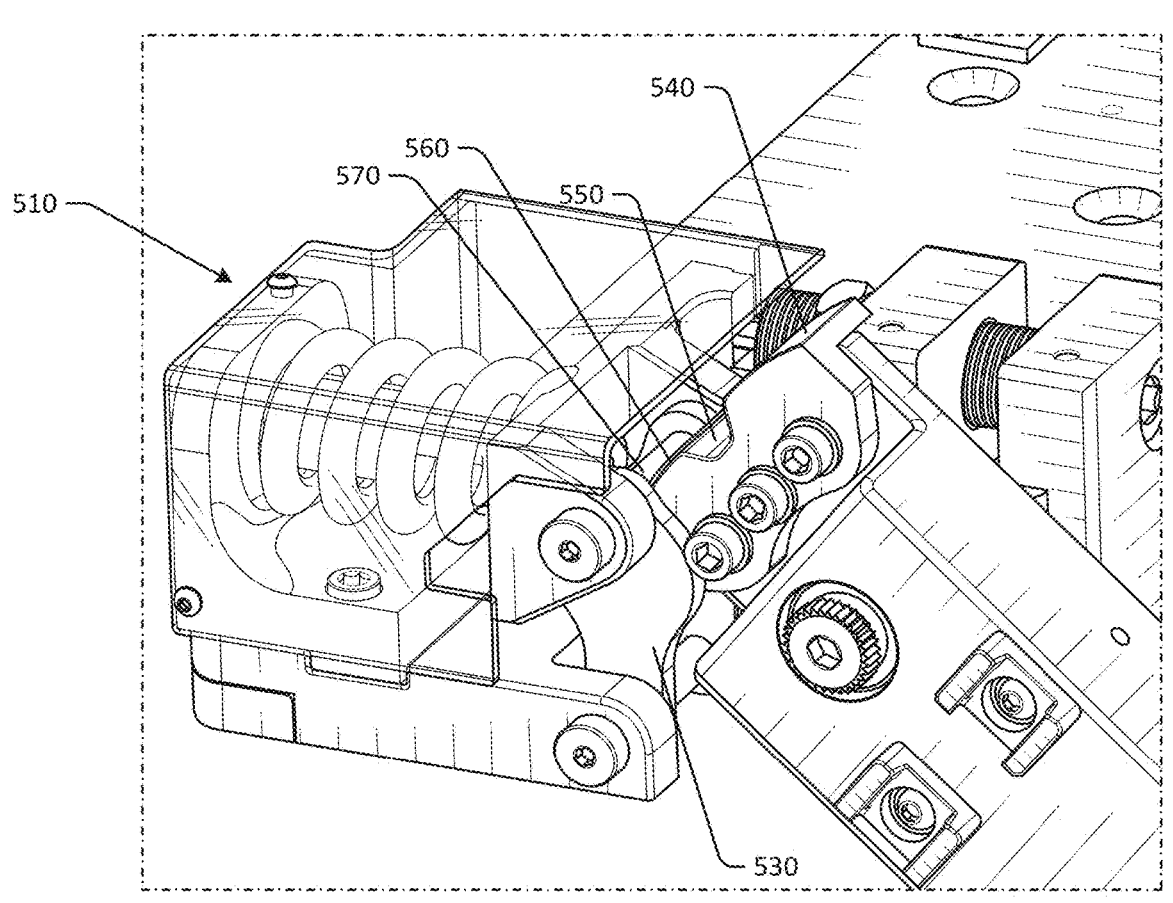
Figure 5C:
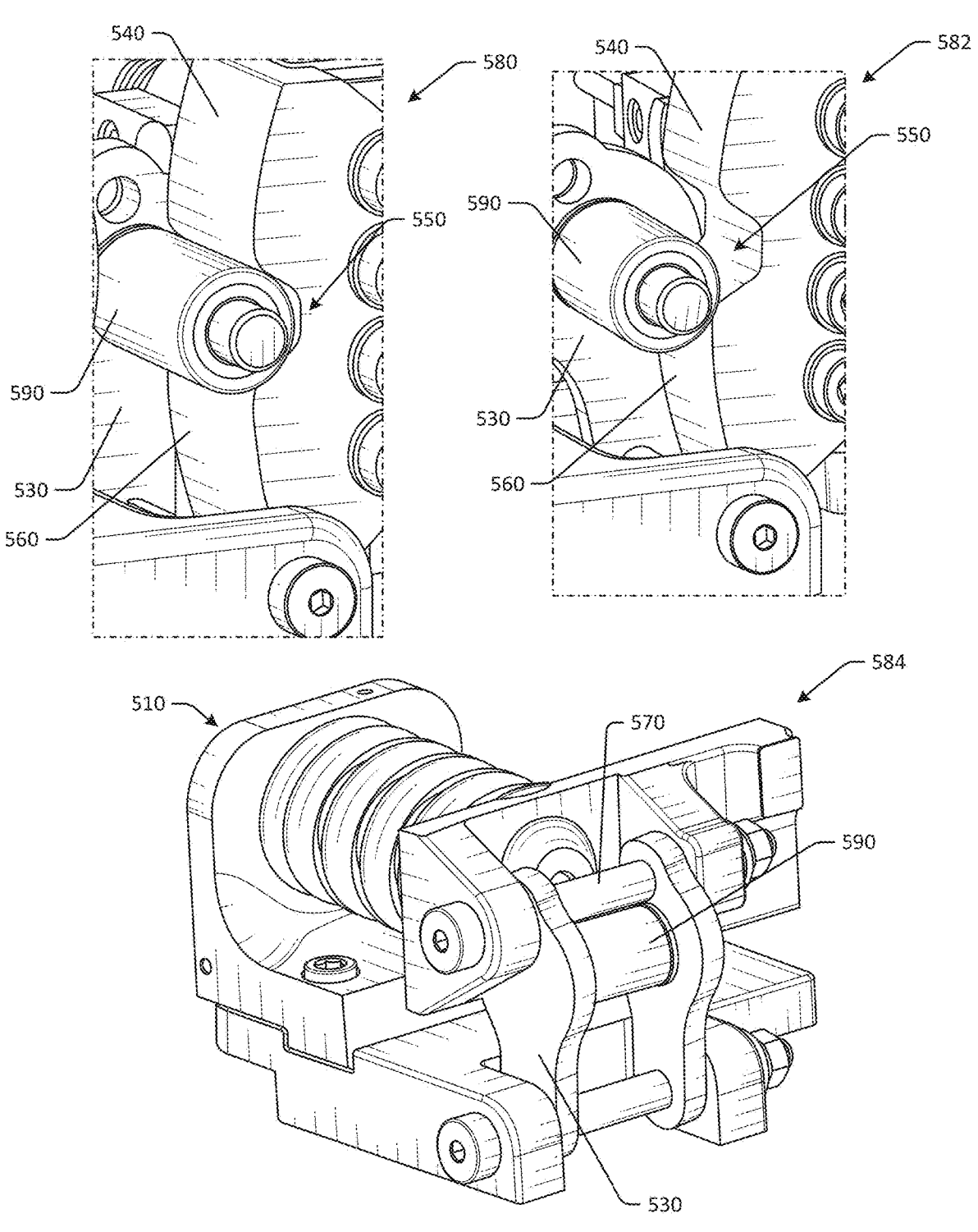

FIGS. 5A-5C are schematic illustrations of an example mechanical breaker assembly in secured and unsecured views in accordance with one or more embodiments of the disclosure. Other embodiments may include additional or fewer components. The illustrations of FIGS. 5A-5C are not to scale, and may not be illustrated to scale with respect to other figures. The mechanical breaker assembly illustrated in FIGS. 5A-5C may be the same mechanical breaker assembly discussed with respect to FIGS. 1A-4.

In FIG. 5A, a breaker assembly 500 is depicted in a semi-exploded view of a default position, in which a backplate 510 of the breaker assembly 500 is in a raised view to illustrate interaction between the raised portion on a lower surface of the backplate 510 and corresponding groove on the support surface. The breaker assembly 500 may include a first bracket 520 and pivot member 530, which allows the first bracket 520 to have an increased range of controlled motion. The pivot portion of the breaker assembly 500 includes the second bracket, which has a detent surface 550 configured to interact with the securing member of the base portion. The second bracket also includes optionally symmetrical curved surfaces 540 adjacent to the detent surface 550. Other embodiments may have asymmetric or different curvatures on either side of the detent surface 550, so as to modify force required for reset in an upwards and/or downwards direction. A force required to pivot the pivot portion can be modifiable based at least in part on a geometry of the detent surface 550. In some embodiments, the breaker assembly 500 may include a proximity sensor 542 disposed adjacent to the pivot portion, where the robotic gantry or other robotic manipulator to which the breaker assembly 500 is coupled may be configured to pause motion based at least in part on feedback from the proximity sensor. In this manner, operation may be paused when the breaker assembly 500 is tripped.

In FIG. 5B, the breaker assembly 500 is depicted with the backplate 510 of the breaker assembly 500 in the final coupled position, and the pivot portion of the breaker assembly 500 is depicted in a rotated or pivoted position downwards. The second bracket is depicted with the securing member 570 sliding along the lower curved surface 570 of the second bracket. After force on the pivot portion is removed, the pivot portion may return to the default or operable position with the securing member 570 in the detent surface 550 of the second bracket.

In FIG. 5C, the breaker assembly 500 is depicted in additional views, with a rolling member 590 (e.g., cylindrical-shaped member, cam follower, etc.) disposed adjacent to the securing member 570. In some embodiments, the rolling member 590 may engage the detent surface 550, as shown in view 580 and may separate from the detent surface 550 when sufficient force is applied, as shown in view 582. A portion of the breaker assembly 500 is shown in perspective view 584 with the arrangement of the rolling member 590 relative to the securing member 570 and respective pivot members 530.

One or more operations of the methods, process flows, or use cases of FIGS. 1A-5C may have been described above as being performed by an item manipulation device, or more specifically, by one or more program module(s), applications, or the like executing on a device. It should be appreciated, however, that any of the operations of the methods, process flows, or use cases of FIGS. 1A-5C may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1A-5C may be described in the context of the illustrative devices, it should be appreciated that such operations may be implemented in connection with numerous other device configurations.

The operations described and depicted in the illustrative methods, process flows, and use cases of FIGS. 1A-5C may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1A-5C may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/ or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 6:
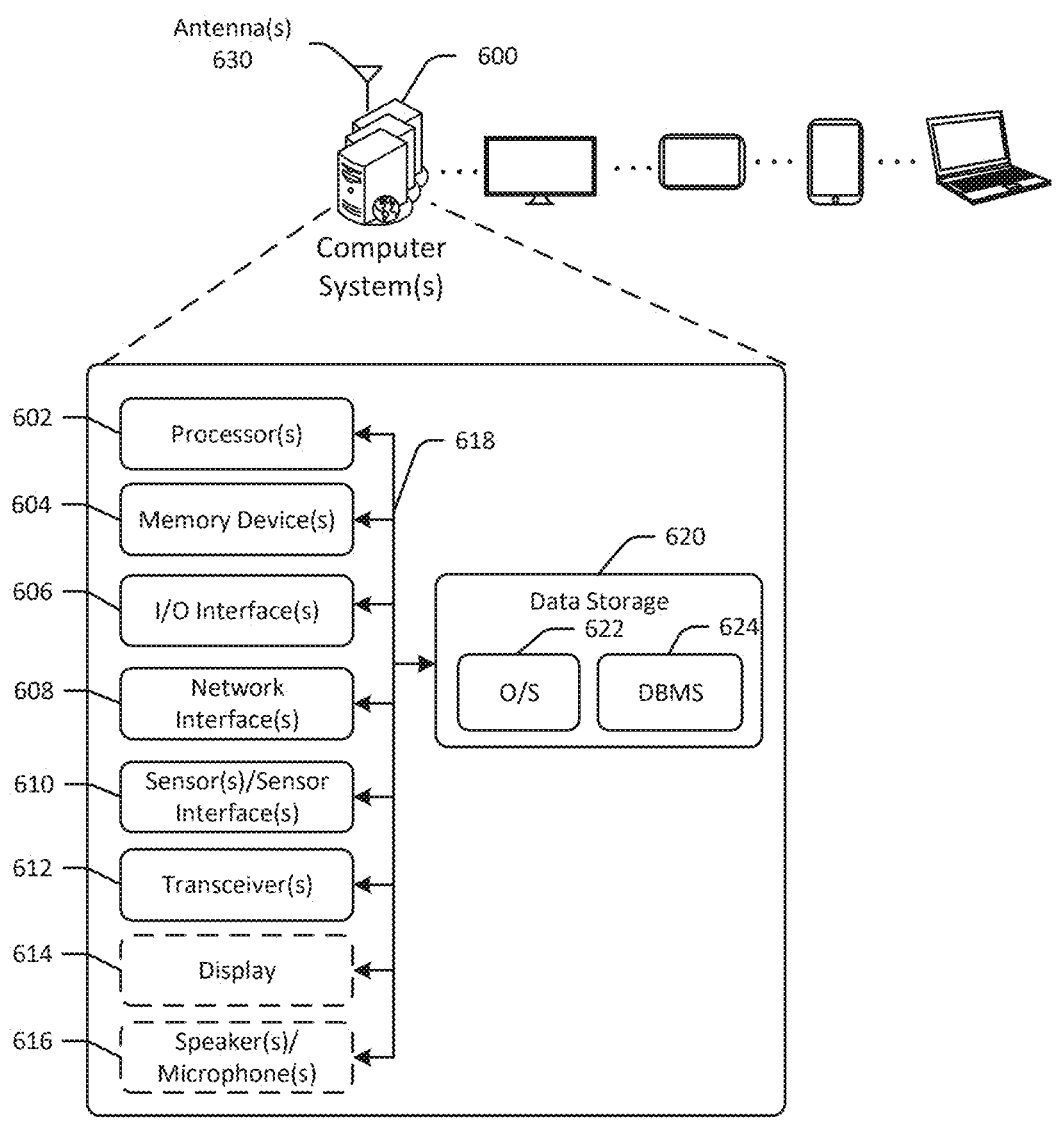
FIG. 6 schematically illustrates an example architecture of a computer system associated with a robotic system in accordance with one or more embodiments of the disclosure.

FIG. 6 is a schematic block diagram of one or more illustrative computer system(s) 600 in accordance with one or more example embodiments of the disclosure. The computer system(s) 600 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 600 may correspond to an illustrative device configuration for the device(s) of FIGS. 1A-5C. For example, the computer system(s) 600 may control one or more aspects of the systems described in FIGS. 1A-5C, such as determining whether items are reoriented, determining item positioning, determining when and what distance to move a robotic manipulator, and so forth.

The computer system(s) 600 may be configured to communicate with one or more servers, user devices, cameras, or the like. The computer system(s) 600 may be configured to identify items, retrieve items or containers, move items or containers, and so forth.

The computer system(s) 600 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 600 may include one or more processors (processor(s)) 602, one or more memory devices 604 (also referred to herein as memory 604), one or more input/output (I/O) interface(s) 606, one or more network interface(s) 608, one or more sensor(s) or sensor interface(s) 610, one or more transceiver(s) 612, one or more optional display(s) 614, one or more optional microphone(s) 616, and data storage 620. The computer system(s) 600 may further include one or more bus(es) 618 that functionally couple various components of the computer system(s) 600. The computer system(s) 600 may further include one or more antenna(s) 630 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit the exchange of information (e.g., data (including computer-executable code), signaling, etc.) between various components of the computer system(s) 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 604 of the computer system(s) 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to the memory 604 for use by the processor(s) 602 during the execution of the computer-executable instructions. Moreover, output data generated as a result of execution of the computer-executable instructions by the processor(s) 602 may be stored initially in the memory 604, and may ultimately be copied to the data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like. Some or all of these module(s) may be sub-module(s). Any of the components depicted as being stored in the data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in the data storage 620 may support functionality described in reference to corresponding components named earlier in this disclosure.

The data storage 620 may further store various types of data utilized by the components of the computer system(s) 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 602 may be configured to access the memory 604 and execute the computer-executable instructions loaded therein. For example, the processor(s) 602 may be configured to execute the computer-executable instructions of the various program module(s), applications, engines, or the like of the computer system(s) 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to other illustrative components depicted as being stored in the data storage 620, the O/S 622 may be loaded from the data storage 620 into the memory 604 and may provide an interface between other application software executing on the computer system(s) 600 and the hardware resources of the computer system(s) 600. More specifically, the O/S 622 may include a set of computer-executable instructions for managing the hardware resources of the computer system(s) 600 and for providing common services to other application programs (e.g., managing memory allocation among various application programs). In certain example embodiments, the O/S 622 may control execution of the other program module(s). The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 600 is a mobile device, the DBMS 624 may be any suitable lightweight DBMS optimized for performance on a mobile device.

Referring now to other illustrative components of the computer system(s) 600, the input/output (I/O) interface(s) 606 may facilitate the receipt of input information by the computer system(s) 600 from one or more I/O devices as well as the output of information from the computer system(s) 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), Fire Wire, Thunderbolt, Ethernet port or other connection protocol that may connect to one or more networks. The I/O interface(s) 606 may also include a connection to one or more of the antenna(s) 630 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 600 may further include one or more network interface(s) 608 via which the computer system(s) 600 may communicate with any of a variety of other systems, platforms, networks, devices, and so forth. The network interface(s) 608 may enable communication, for example, with one or more wireless routers, one or more host servers, one or more web servers, and the like via one or more networks.

The antenna(s) 630 may include any suitable type of antenna depending, for example, on the communications protocols used to transmit or receive signals via the antenna(s) 630. Non-limiting examples of suitable antennas may include directional antennas, non-directional antennas, dipole antennas, folded dipole antennas, patch antennas, multiple-input multiple-output (MIMO) antennas, or the like. The antenna(s) 630 may be communicatively coupled to one or more transceivers 612 or radio components to which or from which signals may be transmitted or received.

As previously described, the antenna(s) 630 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 630 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 630 may be configured to transmit or receive radio frequency signals within any suitable frequency range forming part of the unlicensed portion of the radio spectrum.

The antenna(s) 630 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(s) 630—transmitting or receiving radio frequency (RF) signals in the bandwidth and/or channels corresponding to the communications protocols utilized by the computer system(s) 600 to communicate with other devices. The transceiver(s) 612 may include hardware, software, and/or firmware for modulating, transmitting, or receiving—potentially in cooperation with any of antenna(s) 630—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the computer system(s) 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 614 may be configured to output light and/or render content. The optional speaker(s)/microphone(s) 616 may be any device configured to receive analog sound input or voice data.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the computer system(s) 600 may include alternate and/or additional hardware, software, or firmware components beyond those described or depicted without departing from the scope of the disclosure. More particularly, it should be appreciated that software, firmware, or hardware components depicted as forming part of the computer system(s) 600 are merely illustrative and that some components may not be present or additional components may be provided in various embodiments. While various illustrative program module(s) have been depicted and described as software module(s) stored in the data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for case of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
a robotic gantry; and
a breaker assembly coupled to the robotic gantry, the breaker assembly comprising:
  a base portion comprising:
    a backplate having a fixed position;
    a spring coupled to the backplate; and
    a first bracket configured to receive a securing member;
  a pivot portion configured to pivot with respect to the base portion, the pivot portion comprising:
    a second bracket having a detent surface configured to engage the securing member when the breaker assembly is in a default position;
    a member coupled to the pivot portion; and
    a hook coupled to the member;

wherein the pivot portion pivots with respect to the base portion based at least in part on a force applied to the member, and wherein the pivot portion returns to the default position automatically when the force is no longer applied to the member.

2. The system of claim 1, further comprising:
a proximity sensor disposed adjacent to the pivot portion;
wherein the robotic gantry is configured to pause motion based at least in part on feedback from the proximity sensor.

3. The system of claim 1, wherein the second bracket comprises symmetrical curved surfaces adjacent to the detent surface, and wherein the pivot portion is configured to pivot in both an upwards direction and a downwards direction relative to the base portion.

4. The system of claim 1, wherein the backplate comprises a raised portion along a lower surface of the backplate, and wherein the base portion further comprises a support surface having a groove configured to receive the raised portion of the backplate.

5. A breaker assembly comprising:
a base portion comprising:
  a backplate having a fixed position;
  a spring coupled to the backplate; and
  a first bracket configured to receive a securing member;
a pivot portion configured to pivot with respect to the base portion, the pivot portion comprising:
  a second bracket having a detent surface configured to engage the securing member when the breaker assembly is in a default position; and
a member coupled to the pivot portion;
wherein the pivot portion pivots with respect to the base portion based at least in part on a force applied to the member, and wherein the pivot portion returns to the default position automatically when the force is no longer applied to the member.

6. The breaker assembly of claim 5, further comprising:
a hook coupled to the member.

7. The breaker assembly of claim 5, wherein the second bracket comprises symmetrical curved surfaces adjacent to the detent surface.

8. The breaker assembly of claim 5, wherein the pivot portion is configured to pivot in both an upwards direction and a downwards direction relative to the base portion.

9. The breaker assembly of claim 5, wherein the backplate comprises an extended portion along a lower surface of the backplate, and wherein the base portion further comprises a support surface having a groove configured to receive the extended portion of the backplate.

10. The breaker assembly of claim 5, wherein a force required to pivot the pivot portion is modifiable based at least in part on a geometry of the detent surface.

11. The breaker assembly of claim 5, wherein a spring preload value of the spring is modifiable via modifying a distance between the first bracket and the backplate.

12. The breaker assembly of claim 5, wherein the securing member is a rolling member disposed laterally across the first bracket, and wherein the detent surface engages a body of the rolling member when the breaker assembly is in a default position.

13. The breaker assembly of claim 5, further comprising:
a pivot member coupled to the support surface, wherein the pivot member is configured to pivot with respect to the support surface, and wherein the first bracket is coupled to the pivot member and configured to move relative to the pivot member.

14. The breaker assembly of claim 13, wherein the breaker assembly is coupled to a robotic gantry configured to move in a vertical direction, the breaker assembly further comprising:

a proximity sensor disposed adjacent to the pivot portion;

wherein the robotic gantry is configured to pause motion based at least in part on feedback from the proximity sensor.

15. A system comprising:

a robotic gantry; and a breaker assembly coupled to the robotic gantry, the breaker assembly comprising:

a base portion comprising:

a backplate having a fixed position;

a spring coupled to the backplate; and a first bracket configured to receive a securing member;

a pivot portion configured to pivot with respect to the base portion, the pivot portion comprising:

a second bracket having a detent surface configured to engage the securing member when the breaker assembly is in a default position; and a member coupled to the pivot portion;

wherein the pivot portion pivots with respect to the base portion based at least in part on a force applied to the member, and wherein the pivot portion returns to the default position automatically when the force is no longer applied to the member.

16. The system of claim 15, further comprising:

a proximity sensor disposed adjacent to the pivot portion;

wherein the robotic gantry is configured to pause motion based at least in part on feedback from the proximity sensor.

17. The system of claim 15, wherein the second bracket comprises symmetrical curved surfaces adjacent to the detent surface.

18. The system of claim 15, wherein the backplate comprises an extended portion along a lower surface of the backplate, and wherein the base portion further comprises a support surface having a groove configured to receive the extended portion of the backplate.

19. The system of claim 15, wherein a spring preload value of the spring is modifiable via modifying a distance between the first bracket and the backplate, and wherein a force required to pivot the pivot portion is modifiable based at least in part on a geometry of the detent surface.

20. The system of claim 15, wherein the securing member is a rolling member disposed laterally across the first bracket, and wherein the detent surface engages a body of the rolling member when the breaker assembly is in a default position.

\*    \*    \*    \*    \*